United States Patent [19] [11] 4,234,348
Brunn et al. [45] Nov. 18, 1980

[54] PROCESS FOR THE PRODUCTION OF IRON OXIDE RED PIGMENTS

[75] Inventors: Horst Brunn; Heribert Bade; Franz Hund, all of Krefeld, Fed. Rep. of Germany

[73] Assignee: Bayer Aktiengesellschaft, Leverkusen, Fed. Rep. of Germany

[21] Appl. No.: 41,466

[22] Filed: May 22, 1979

[30] Foreign Application Priority Data

Jun. 20, 1978 [DE] Fed. Rep. of Germany ........ 2826941

[51] Int. Cl.³ .............................................. C09C 1/24
[52] U.S. Cl. ................................. 106/304; 423/633; 423/634
[58] Field of Search ............... 106/304; 423/633, 634

[56] References Cited

U.S. PATENT DOCUMENTS 3,565,656  2/1971  Allen et al. ........................ 106/304
4,145,228  3/1979  Croce et al. ....................... 106/304

FOREIGN PATENT DOCUMENTS 2006774  8/1971  Fed. Rep. of Germany ........... 106/304
2255464  5/1973  Fed. Rep. of Germany ........... 106/304

Primary Examiner—Helen M. McCarthy
Attorney, Agent, or Firm—Sprung, Felfe, Horn, Lynch & Kramer

[57] ABSTRACT

In the production of an iron oxide red pigment by reducing nitrobenzene with metallic iron in the presence of an acidic iron (II) salt solution, separating off the iron oxide pigment obtained from the reaction medium by washing out, and calcining the pigment at a temperature in the range of about 600° to 1100° C., the improvement which comprises adding an aluminum salt solution over a period of about 5 to 360 minutes at a temperature of about 20° to 100° C. to the iron oxide suspension accumulating during reduction of the nitrobenzene, the suspension containing about 150 to 600 g of iron/l and a residual iron (II) chloride content of about 20 to 160 g/l expressed as iron, the initial pH-value of the iron oxide suspension of about 3 to 5 being adjusted over a period of about 5 to 180 minutes to a final pH-value of about 5.5 to 6.5.

5 Claims, No Drawings

PROCESS FOR THE PRODUCTION OF IRON OXIDE RED PIGMENTS

It is known that iron oxide red pigments can be obtained by calcining precursor compounds which are produced in hydrochloric acid medium by the oxidation of iron turnings with nitrobenzene in the presence of metal salts (cf. German Pat. Nos. 463,773; 464,561; 515,758; 516,999; 551,254 and 703,416). Although the processes in question give excellent iron oxide red pigments with very high covering power, the iron oxide red pigments thus produced, in comparison with red pigments produced by precipitation, show lower chroma (corresponding to the value $A_s$ in the Adams-Nickerson (AN) Colour System) and are not of equal lightness. In general, they show a tendency towards darker shades of red. Finally, limits are imposed on the process in regard to finely divided pigments and, hence, yellow-tinged hues. With decreasing particle size, calcination is accompanied by increasing sintering which, beyond a certain particle size, adversely affects the properties of the pigments.

German Offenlegungsschrifts Nos. 1,803,637 and 2,006,774 describe a two-stage process for the production of iron oxide pigments, in which an iron oxide black seed obtained by reducing nitrobenzene has more iron oxide deposited onto it by precipitation. After washing, the pigment thus coated is filtered off and, according to the application envisaged, is heated to temperatures of from 80° to 150° C. (iron oxide black) or to temperatures of from 600° to 1000° C. (iron oxide red). Although pigments produced in this way give blue-tinged iron oxide black pigments of very high tinting strength, the red pigments obtained after calcination do not have the quality of pigments produced by precipitation.

An object of the present invention is to provide red pigments by reducing nitrobenzene with iron in acid solution, which pigments have properties as good as those of the products obtained by the more expensive precipitation process or by the thermolysis of highly pure iron (II)sulphate compounds.

The present invention provides a process for the production of iron oxide red pigments by reducing nitrobenzene with metallic iron in the presence of acidic iron(II)salt solutions, separating off the iron oxide pigments obtained from the reaction medium by washing out and calcining them at temperatures in the range of about 600° to 1100° C., characterized in that an aluminum salt solution is added over a period of about 5 to 360 minutes at temperatures of about 20° to 100° C. to the non-worked-up iron oxide suspension accumulating during reduction of the nitrobenzene, which has a solids content of about 150 to 600 g/l, expressed as iron, and a residual iron(II)chloride content of from about 20 to 160 g/l, expressed as iron, the initial pH-value of the iron oxide suspension of about 3 to 5 being adjusted over a period of about 5 to 180 minutes to a final pH-value of from about 5.5 to 6.5.

In the process according to the invention, an $Fe_3O_4$ (iron oxide black) or $\alpha$-FeOOH (iron oxide yellow) suspension, hereinafter referred to as iron oxide suspension, is initially produced in known manner by the reduction of nitrobenzene, i.e. by reacting metallic iron with nitrobenzene in an acidic medium in the presence of metal salt solutions at temperatures in the range of from about 25° to 100° C. After reduction of the nitrobenzene, most of the aniline formed is separated off and the residue left in the reaction mixture is driven out with steam. The reaction mixture is then diluted with water to the concentration required for further processing, optionally followed by the addition of more iron(II)salt.

In the next process step, an aluminum salt solution is slowly added over a period of about 5 to 60 minutes to the iron oxide suspension obtained, which has a residual iron(II)salt content of from 20 to 160 g/l, expressed as iron, followed by treatment at an initial pH-value of from 3 to 5 up to a final pH-value of from 5.5 to 6.5 preferably about 5.5 to 6, with addition of alkalis, preferably dissolved in water. The precipitation time amounts to between about 5 and 180 minutes and preferably from about 30 ton 120 minutes. Particularly good results are obtained by carrying out precipitation at temperatures of about 60° to 95° C. at an initial pH-value of about 3.5 up to a final pH-value of about 5.5. An upper limit to the quantity of aluminum oxide precipitated onto the pigment particles is imposed by the lightness which it imparts to the red iron oxide pigment. In general, it amounts to about 0.2 to 10% by weight, expressed as aluminum and based on iron oxide red pigment ($Fe_2O_3$). With decreasing quantities of aluminum oxide, it is possible to provide the pure iron(III)oxides with any intermediate hues between yellow-red and brick-red. In the process according to the invention, the hue is surprisingly not affected by the impurities of bivalent metal ions, for example manganese, which may possibly be present in the iron oxide suspension.

In one preferred embodiment of the process according to the invention, the aluminum oxide aquate is directly precipitated onto the pigment with aluminate solutions, preferably sodium aluminate solutions, in which case the alkali content of the aluminate solution is preferably selected in such a way that, on completion of precipitation, the required final pH-value of the iron oxide black or yellow suspension is also reached. In this case, the precipitation time amounts to about 5 to 360 minutes, preferably from 30 to 120 minutes.

The temperatures at which the iron oxide black or iron oxide yellow pigment particles, which have been washed out and filtered off, are calcined may be in the range of from about 600° to about 1100° C., depending on the required hue of the iron oxide red pigment to be produced, the preferred full red hues occurring in particular at temperatures in the range of from about 800 to 950° C. However, the calcination temperature is coupled with the calcination time and any increase in the calcination temperature may be equalized by reducing the calcination time and vice versa.

The process according to the invention gives pigments with yellow, full and deep red hues and a high tinting strength. Another advantage of the process according to the invention lies in the fact that, by virtue of the co-precipitation (due to the high residual iron(II)salt content in the solution during precipitation of the aluminum, some iron (II)ions are co-precipitated), the iron oxide red pigments treated in accordance with the invention are softer in regard to their grinding behavior than known pigments.

The process according to the invention is illustrated by the following examples:

EXAMPLE 1a

Production of the iron oxide black suspension 70 ml of AlCl$_3$-solution (160 g/l), 15 ml of water, 2 ml of 96% sulphuric acid, 20 ml of nitrobenzene and 200 g of ground iron turnings containing 0.4% of Mn and 0.2% of Cu are added to 130 ml of FeCl$_2$-solution (360 g/l). After this mixture has been heated with stirring to 90° C., 135 ml of nitrobenzene are run in over a period of 2 hours. After reduction of the nitrobenzene, most of the aniline is decanted off and the residue left in the iron oxide suspension is driven out with steam. The iron oxide sludge is then diluted with water to the concentration required for further processing, optionally followed by the addition of more FeCl$_2$.

EXAMPLE 1b

Treatment with aluminum salt solution 50 ml of an aluminum salt solution (100 g of Al$_2$O$_3$ per liter) were added with stirring over a period of 60 minutes at 80° C. to an iron oxide black suspension produced in accordance with Example 1a, which had a solids content of 260 g of Fe$_3$O$_4$, corresponding to 290 g of Fe/l, and an FeCl$_2$-content of 66 g, corresponding to 45 g of Fe/l, followed by adjustment from an initial pH-value of approximately 3.5 to a final pH-value of 5.5 over a period of 60 minutes using 10% sodium hydroxide solution. After the residual salts had been washed out with water, the Fe$_3$O$_4$ was filtered off and calcined at 880° C.

An iron oxide red with a yellow, full and deep red hue coupled with excellent tinting strength was obtained in this way. It had a particle size of around 0.1μ.

EXAMPLE 1c

Treatment with aluminate solution 20 ml of an aluminate solution (250 g of Al$_2$O$_3$ per liter), in which the ratio of alkali metal to aluminum amounted to approximately 1.3, were added with stirring over a period of 90 minutes at 75° C. to an iron oxide black suspension produced in accordance with Example 1a, which had a solids content of 260 g of Fe$_3$O$_4$, corresponding to 290 g of Fe/l, and a residual FeCl$_2$-content of 66 g, corresponding to 45 g of Fe/l. After the residual salts had been washed out with water, the pigment was filtered off and calcined at 880° C.

An iron oxide red with a yellow, full red hue coupled with high tinting strength was obtained in this way. It had a particle size of around 0.1μ.

EXAMPLE 2a

Production of the iron oxide yellow suspension 210 ml of AlCl$_3$-solution (160 g/l), 50 ml of nitrobenzene and 50 g of ground iron turnings, containing approximately 0.4% by weight of manganese and approximately 0.2% by weight of copper, are added to 100 ml of FeCl$_2$-solution (360 g/l). This mixture is heated with stirring and reflux cooling to a temperature of 95° C., after which 200 ml of nitrobenzene and 237 g of ground iron containing approximately 0.4% of Mn and 0.2% of Cu are simultaneously run into it over periods of, respectively, 2 hours and 3 hours. In addition, approximately 300 ml of water are gradually run in (when the reaction mixture exceeds a certain consistency). On completion of reduction, the aniline formed is separated off from the iron oxide hydroxide partly by decantation and partly by distillation with steam and the iron oxide yellow suspension is diluted with water to the concentration required for further processing, optionally followed by the addition of more FeCl$_2$.

EXAMPLE 2b

Treatment with aluminum salt solution 80 ml of an aluminum salt solution (100 g of Al$_2$O$_3$ per liter) were added with stirring over a period of 60 minutes at 80° C. to an iron oxide yellow suspension produced in accordance with Example 2a, which had a solids content of 450 g of FeO(OH), corresponding to 250 g of Fe/l, and an FeCl$_2$-content of 90 g, corresponding to 35 g of Fe/l, followed by adjustment from an initial pH-value of about 3.5 to a final pH-value of 5.5 over a period of 60 minutes using an approximately 10% sodium hydroxide solution. After the residual salts had been washed out with water, the iron oxide hydroxide was filtered off and calcined at 900° C.

An iron oxide red with a yellow, full red hue coupled with high tinting strength was obtained in this way, its acicular particles measuring approximately 0.1 to 0.8μ.

EXAMPLE 2c

Treatment with aluminate solution 32 ml of an aluminate solution 250 g of Al$_2$O$_3$ per liter), in which the ratio of alkali metal to aluminum amounted to approximately 1.3, were added over a period of 90 minutes with stirring at 75° C. to an iron oxide yellow suspension produced in accordance with Example 2a, which had a solids content of 450 g of FeO(OH), corresponding to 250 g of Fe/l, and an FeCl$_2$- content of 90 g, corresponding to 35 g of Fe/l. After the residual salts had been washed out with water, the pigment was filtered off and calcined at 900° C.

A yellow-tinged iron oxide red of high tinting strength was obtained in this way, its particle size being approximately 0.1×0.8μ.

It will be appreciated that the instant specification and examples are set forth by way of illustration and not limitation, and that various modifications and changes may be made without departing from the spirit and scope of the present invention.

What is claimed is:

1. In the production of an iron oxide red pigment by reducing nitrobenzene with metallic iron in the presence of an acidic iron (II) salt solution, separating off the iron oxide pigment obtained from the reaction medium by washing out, and calcining the pigment at a temperature in the range of about 600° to 1100° C., the improvement which comprises adding an aluminum salt solution over a period of about 5 to 360 minutes at a temperature of about 20° to 100° C. to the iron oxide suspension accumulating during reduction of the nitrobenzene, the suspension containing about 150 to 500 g of iron/l and a residual iron (II) chloride content of about 20 to 160 g/l expressed as iron, the initial pH-value of the iron oxide suspension of about 3 to 5 being adjusted over a period of about 5 to 180 minutes to a final pH-value of about 5.5 to 6.5.

2. A process as claimed in claim 1, wherein the nitrobenzene reduction is effected to produce an iron oxide black suspension.

3. A process as claimed in claim 1, wherein the nitrobenzene reduction is effected to produce an iron oxide yellow suspension.

4. A process as claimed in claim 1, wherein the aluminum salt solution is added over about 5 to 60 minutes to the suspension at a temperature of about 60° to 95° C., the suspension having a residual iron (II) salt content of about 20 to 160 g of iron/l, the final pH ranging from about 5.5 to 6, about 0.2 to 10% of aluminum being deposited based on the weight of iron oxide pigment.

5. A process as claimed in claim 1, wherein the aluminum salt solution is a sodium aluminate solution and it is added over a period of about 30 to 120 minutes.

* * * * *